US010427073B2

(12) United States Patent
Bitsch-Larsen et al.

(10) Patent No.: US 10,427,073 B2
(45) Date of Patent: Oct. 1, 2019

(54) ROTARY PRESSURE FILTER APPARATUS WITH REDUCED PRESSURE FLUCTUATIONS

(71) Applicant: BP Corporation North American Inc., Naperville, IL (US)

(72) Inventors: Anders Bitsch-Larsen, Wheaton, IL (US); Timothy H. Keyes, Madison, AL (US); Thomas M. Bartos, Arden, NC (US)

(73) Assignee: BP Corporation North America Inc., Houston, TX (US)

( * ) Notice: Subject to any disclaimer, the term of this patent is extended or adjusted under 35 U.S.C. 154(b) by 422 days.

(21) Appl. No.: 15/322,320

(22) PCT Filed: Jul. 23, 2015

(86) PCT No.: PCT/US2015/041793
§ 371 (c)(1),
(2) Date: Dec. 27, 2016

(87) PCT Pub. No.: WO2016/014830
PCT Pub. Date: Jan. 28, 2016

(65) Prior Publication Data
US 2018/0207558 A1     Jul. 26, 2018

Related U.S. Application Data

(60) Provisional application No. 62/029,065, filed on Jul. 25, 2014.

(51) Int. Cl.
*B01D 33/067*     (2006.01)
*B01D 33/073*     (2006.01)
*B01D 33/09*     (2006.01)
*B01D 33/80*     (2006.01)

(52) U.S. Cl.
CPC ......... *B01D 33/067* (2013.01); *B01D 33/073* (2013.01); *B01D 33/09* (2013.01); *B01D 33/801* (2013.01); *B01D 2201/347* (2013.01)

(58) Field of Classification Search
CPC .... B01D 33/067; B01D 33/073; B01D 33/09; B01D 33/801; B01D 2201/347
See application file for complete search history.

(56) References Cited

U.S. PATENT DOCUMENTS

| | | | |
|---|---|---|---|
| 2,741,369 | A | 4/1956 | Fest |
| 5,093,001 | A | 3/1992 | Ueda |
| 5,676,847 | A | 10/1997 | Yamamoto et al. |
| 2005/0051473 | A1 | 3/2005 | Suss et al. |
| 2005/0236339 | A1 | 10/2005 | Grace et al. |
| 2008/0061011 | A1 | 3/2008 | Schmid |

FOREIGN PATENT DOCUMENTS

| | | |
|---|---|---|
| FR | 1169569 | 12/1958 |
| WO | WO-2009/135987 | 11/2009 |

*Primary Examiner* — Krishnan S Menon
*Assistant Examiner* — Waqaas Ali
(74) *Attorney, Agent, or Firm* — McDonnell Boehnen Hulbert & Berghoff LLP

(57) ABSTRACT

A rotary pressure filter apparatus, a sealing device for use with the rotary pressure filter apparatus, and a process of using the apparatus. The rotary pressure filter apparatus is designed to treat a solid-liquid mixture under pressure in successive work zones. A rotary drum moves compartments containing the solid-liquid mixture through the successive zones. The zones are separated by a sealing member, which is designed to reduce pressure fluctuations as the compartments enter a successive zone.

23 Claims, 5 Drawing Sheets

ROTARY PRESSURE FILTER APPARATUS WITH REDUCED PRESSURE FLUCTUATIONS

CROSS-REFERENCE

This application claims the benefit under 35 U.S.C. § 119(e) of U.S. Provisional application No. 62/029,065 filed Jul. 25, 2015, the contents of which are incorporated by reference in their entireties herein.

TECHNICAL FIELD

The present teachings relate generally to rotary pressure filter apparatus, and in particular, to a rotary pressure filter apparatus having a sealing member configured to reduce pressure fluctuations.

BACKGROUND

In many processes in the chemical, food, and pharmaceutical industries, various separation techniques are used to isolate one material from another. Common techniques for separating solid materials from a liquid include vacuum or pressure filtration, drying, centrifugation, sedimentation and clarification. When a very pure solid product is required, separation may occur in multiple stages and may be combined with washing steps. For example, a solid recovered from one of the techniques noted above may be washed or reslurried with additional liquids in order to remove impurities before being subjected to another solid-liquid separation technique to recover a final, more pure product.

Multiple-stage separation techniques may result in higher purities of solid products, but may require substantially more investment in equipment. One highly successful method to reduce capital expenditures in a multi-stage separation is through the use of a rotary pressure filter apparatus. Rotary pressure filter apparatus have been designed to perform more than one of the steps of a multiple-stage separation technique in a single piece of equipment by progressing the material being processed through separate work zones. For example, known rotary pressure filter apparatus perform a filtration in a filter or feed zone to form a filter cake, followed by a washing of the filter cake in one or more wash zones. The washed filter cake may be dried in a drying zone before leaving the rotary pressure filter. Rotary pressure filter apparatus are generally known in the art and are disclosed, for example, in U.S. Pat. Nos. 2,741,369, 7,807,060 and US Pat. App. 20050051473.

Because the zones of the rotary pressure filter apparatus may be operated at different pressures, some rotary pressure filter apparatus have exhibited pressure fluctuations that have the potential to reduce the capacity of the rotary pressure filter apparatus and damage the filter elements therein.

Accordingly, there remains a need to improve rotary pressure filter apparatus to smooth pressure fluctuations.

SUMMARY

The present invention solves of the problem of pressure fluctuations in the rotary pressure filter by allowing for more gradual opening of filter compartments as the compartments enter a new zone in the apparatus. The result is the potential for greater capacity in the rotary pressure filter apparatus, as well as improved lifespan for the filter elements as they are less prone to damaging movement as a result of pressure fluctuations.

According to one aspect of the present invention, a rotary pressure filter apparatus having improved flow characteristics is provided. The rotary pressure filter includes a housing capable of withstanding an internal pressure above ambient; a rotary drum having at least one generally round cross-section and configured to rotate inside the housing wall around an axis, a length of the axis defining a longitudinal direction; the rotary drum being spaced from the housing to define a generally annular plenum therebetween; at least one sealing member configured to contact the rotary drum, each sealing member separating the annular plenum between the housing and the rotary drum into zones, the sealing members adapted to pressure seal each zone from the other zones, the sealing member extending in a generally tangential direction and in the longitudinal direction, the sealing member having at least one cutout portion such that the size of the at least one cutoff portion in the generally tangential direction is variable along at least one portion of the longitudinal direction; at least one material passageway adapted to allow passage of material between the annular plenum in each zone and a location outside the housing; a plurality of compartments on an outer surface of the rotary drum and configured such that material can be flow between the plenum and the compartments, the compartments positioned so as to rotate sequentially through each of the zones as the rotary drum rotates, each compartment having at least one filter member; and at least one filtrate outlet in fluid communication with the at least one filter member. According to another aspect of the present invention, the foregoing rotary pressure filter apparatus is used in a process to recover a solid product, or a liquid, or both, from a solid/liquid mixture.

According to another aspect of the present invention, a sealing apparatus for a rotary pressure filter is provided. The sealing member has a a unitary body, the unitary body having a first side extending along a length and a width of the sealing member, a second side of the sealing element being spaced from the first side and connected to the first sides by edges, the volume between the first side and the second side defining a thickness of the sealing member, the second side being curved and concave relative to the first side, the second side configured to fit flush against the surface of a cylindrical drum, the second side having at least one cutout portion such that the width of the sealing is variable along at least one portion of its length; and a mechanism adapted to actuate the sealing member, the mechanism configured to move the sealing member in the direction of its thickness.

Other aspects of the present invention will be apparent in view of the description that follows.

DETAILED DESCRIPTION OF THE PREFERRED EMBODIMENTS

By way of general introduction, the present invention is directed to rotary pressure filter apparatus for processing a solid-liquid mixture in a plurality of successive work zones. Rotary pressure filter apparatus are generally known in the art and are disclosed, for example, in U.S. Pat. Nos. 2,741,369, 7,807,060 and US Pat. App. 20050051473.

In some embodiments, the rotary pressure filter apparatus is used to recover a solid product, or a liquid, or both, from a solid/liquid mixture. In some embodiments, the solid product is a pharmaceutical or a food component product. In other embodiments, the solid product is a chemical, or in particular, a petrochemical. In some embodiments, the product is an aromatic hydrocarbon such as paraxylene. In other embodiments, the product is an aromatic carboxylic acid, such as terephthalic acid.

Figure 1:
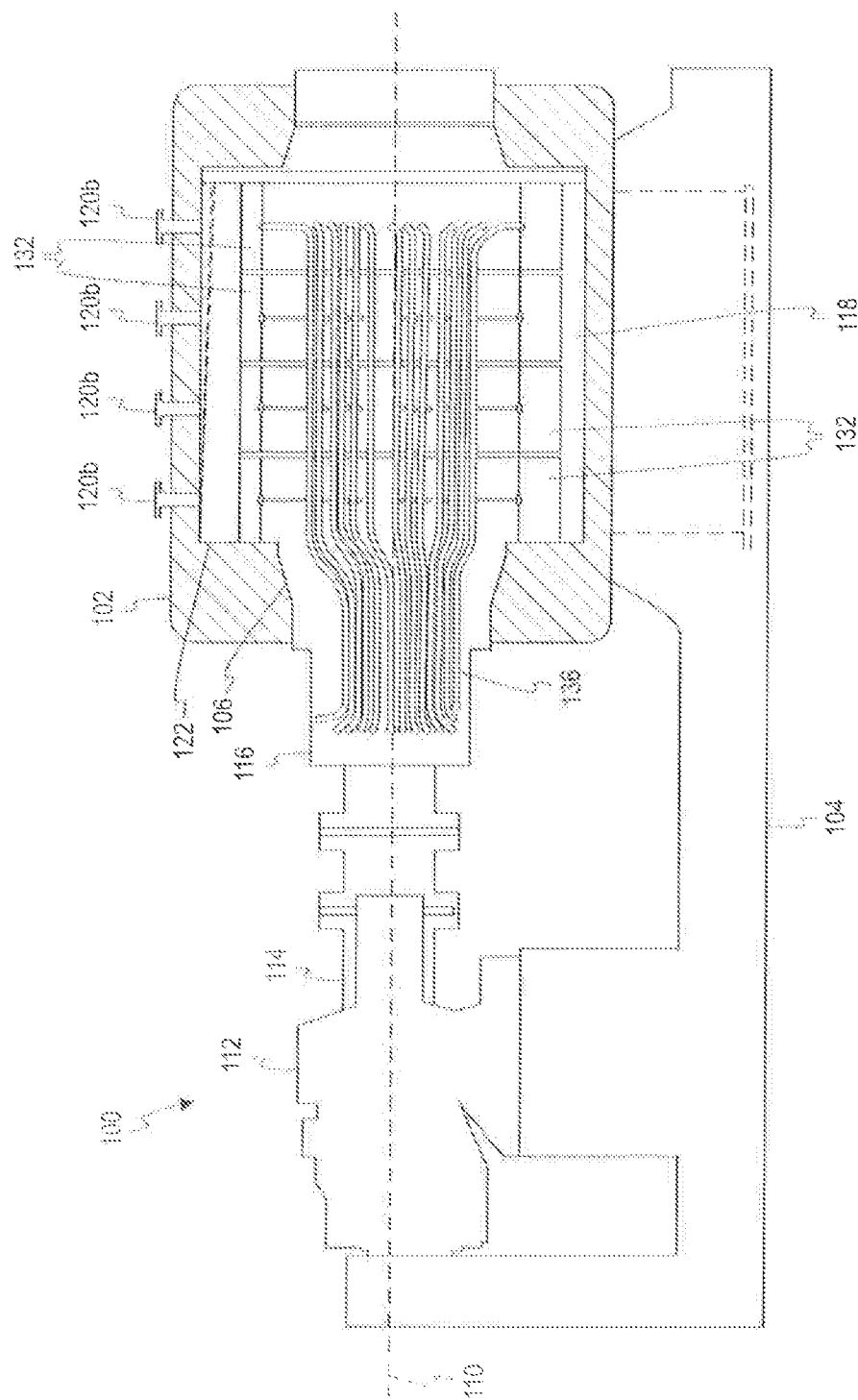
FIG. 1 shows a side view cross-section of a rotary pressure filter apparatus according to one embodiment of the present invention.

Referring now to FIG. 1, a longitudinal cross section of rotary pressure filter apparatus in accordance with one embodiment of the invention is shown generally at 100. The rotary pressure filter apparatus 100 operates under a positive pressure to filter and remove liquid from a solid-liquid mixture and to collect a solid product for further processing.

Figure 2:
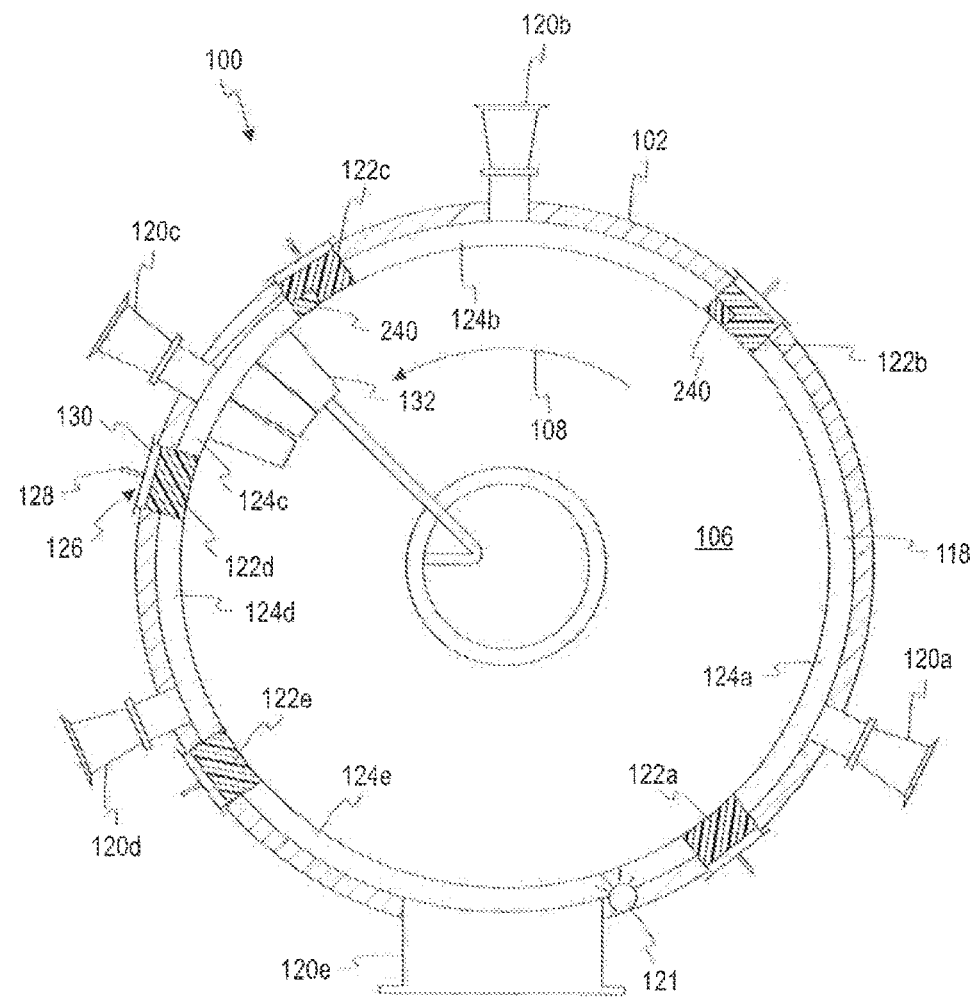
FIG. 2 shows a front view cross-section of a rotary pressure filter according to one embodiment of the present invention.

The rotary pressure filter apparatus 100 includes a stationary housing 102 capable of withstanding an internal pressure above ambient. The housing 102 is mounted upon a frame 104. Inside the housing 102 is a rotary filter drum 106. As shown in FIG. 2, the rotary filter drum 106 rotates as indicated by arrow 108 around an axis 110 (FIG. 1) at speed of about 0.4 to 2 RPM, and in some embodiments at a speed of about 0.8 to 1.5 RPM. An axis 110 defines a longitudinal direction of the rotary drum 106 and the rotary pressure filter apparatus 100. The rotary filter drum 106 is driven by a drive mechanism 112, which is also mounted on the frame 104. A shaft 114 connects the drive mechanism 112 to a control head portion 116 of the rotary drum 106.

Referring now to FIG. 2, the surface of the rotary drum 106 is spaced from the inside of the housing 102 such that a generally annular plenum 118 is formed therebetween, Material passageways 120a, 120b, 120c, 120d, and 120e, such as inlets and outlet piping, are adapted to allow passage of material between the annular plenum 118 and a location outside the housing 102.

One or more sealing members 122a, 122b, 122c, 122d, 122e are configured to contact the rotary drum 106 and divide the annular plenum 118 into a plurality of zones 124a, 124b, 124c, 124d, 124e. The sealing members 122 generally contact the rotary drum with enough pressure to pressure seal the zones 124 from each other but still allowing the rotary drum 106 to rotate. The sealing members 122 are each part of a sealing device 126 which includes an actuating mechanism adapted to members 122 in the radial direction to exert force against the rotary drum 106. In the embodiment shown, the actuating mechanism is a pneumatic device including an inlet 128 for introducing gas into a plenum 130 to exert a pressure force against the outer surface of the respective sealing member 122. Suitable pressure forces exerted by the pneumatic device include those about 0.8 to 2.0 bar above the highest pressure in any of the zones 124a-124e of the rotary pressure filter apparatus 100. Those skilled in the art will recognize that other actuating mechanisms may be substituted for the pneumatic device.

Figure 3:
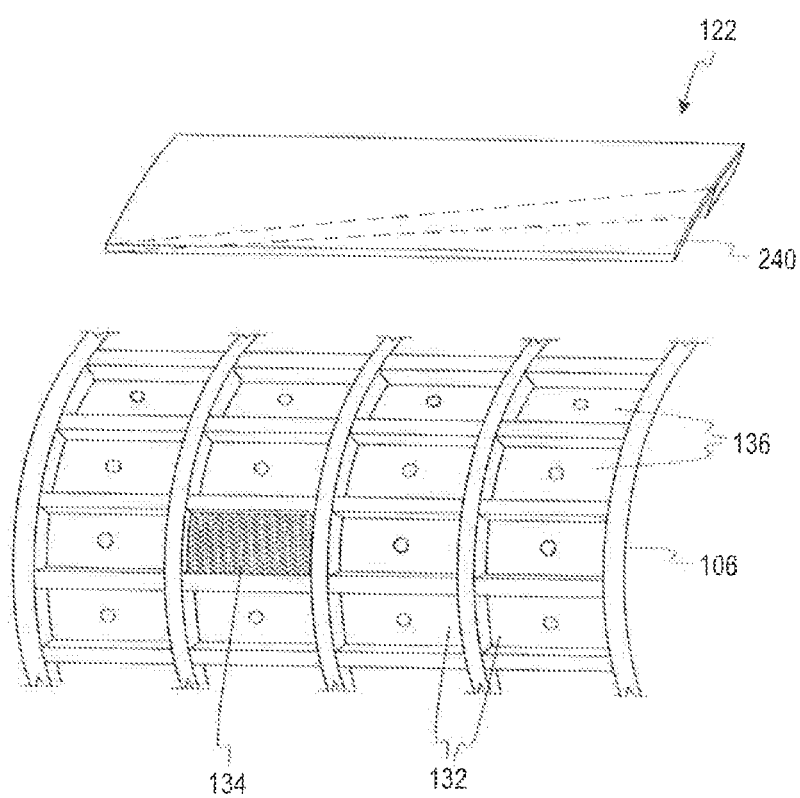
FIG. 3 shows an exploded perspective view of a portion of a rotary drum and a sealing member for use in one embodiment according to the present invention.

Referring now to FIG. 3, a plurality of compartments 132 are arranged around the outer surface or circumference of the rotary filter drum 106 and rotate with the filter drum 106. The compartments 132 each include a filter member 134 (shown in one compartment in FIG. 3) adjacent the filter drum. In some embodiments the filter member comprises a filter cloth supported over a metal screen in a filter housing (not shown). In some embodiments, the filter cloth is manufactured from a polyether ether ketone (PEEK) polymer or a polyvinylidene difluoride (PVDF) polymer. Each compartment 132 also has associated with it a corresponding outlet pipe 136 which also rotates with the filter drum 106 and the compartments 118. The outlet pipes 136 are configured such that filtrate received each compartment 118 passes through its corresponding filter member 134 adjacent the filter drum 106 and into its corresponding outlet pipe 136. The outlet pipes 136 remove the filtrate from the compartments 132 and deliver the filtrate to the control head 116, where it is collected through additional piping (not shown) and removed from the rotary pressure filter apparatus 100.

The compartments 132 rotate with the rotary drum 106 and accordingly pass sequentially pass through each of the zones 124a, 124b, 124c, 124d, 124e. In the embodiment shown, the compartments 132 are arranged in rows of four along the longitudinal direction 110. Those skilled in the art will recognize that other configurations of the compartments would be suitable as well.

In operation, a pressurized feed containing a solid-liquid mixture is introduced into the feed inlet material passageway 120a and into plenum 118 in a first zone designated as feed zone 124a. The solid-liquid mixture is distributed into compartments 132. In some embodiments, the pressure in the feed zone is maintained at about 3 bar(g) to about 7 bar(g), and in some embodiments, 5 bar(g) to 6 bar(g). As a result of the pressure differential that is maintained between the compartments 132 and the outlet pipes 136 and across the filter member 134 in the compartments, liquid of the solid-liquid mixture is forced through the filter member 134 into outlet pipes 136. Filtrate thus exits the rotary pressure apparatus 100 through outlet pipes 136. The solid components of the solid-liquid mixture remain on the filter members 134 in the form of a filter cake.

As the rotary drum 106 continues into the next zone 124b, designated as a wash zone, wash fluid is introduced into plenum 118 for distribution into the compartments 132 to wash the cake remaining on the filter members 134. In some embodiments, wash fluid in introduced at a rate of about 0.5 kg to about 1.5 kg of wash fluid per 1 kg of filter cake. The wash fluid is removed by outlet 136. In the embodiment shown, the rotary drum then continues to a second wash zone 124c, where additional wash fluid is introduced into zone 124c, designated as a second wash zone, and the cake on the filter members 134 is again washed.

The wash fluid is selected to remove impurities from the filter cake while not interfering with further processing of the filter cake to recover the final solid product. In one embodiment, the wash fluid comprises water. In another embodiment, the wash fluid comprises condensate from another portion of an integrated process.

The rotary drum 106 continues its rotation into drying zone, where a hot inert drying gas is introduced in the plenum 118 to dry the filter cake on the filter members 134. As the rotary drum completes its rotation, the dried filter cake falls from the compartments 132 by gravity into a material passageway 120e designated as a product chute. A rinse solution may be injected through inlet 121 in order to clean the filter members of the compartments 132 before they continue into the next cycle through the zones.

Those skilled in the art will appreciate that other configurations of the rotary pressure filter apparatus 100 may be used in accordance with the present invention. For example, the rotary pressure filter apparatus 100 may include multiple filtering zones and multiple wash zones. In one embodiment, the rotary pressure filter apparatus does not include a drying zone, for example, as disclosed in commonly assigned U.S. Pat Application Ser. No. 61/922,247.

The sealing members 122 in accordance with the present invention are designed to allow the compartments 132 to open more slowly as they enter a new zone. This is achieved by configuring the sealing members 122 to allow only a small portion, and then over time a progressively larger portion, of the compartments 132 to be exposed to the new zone as the compartments 132 rotate through the zones. Accordingly, the sealing members 122 are specifically designed to reduce pressure fluctuations as the compartments pass the sealing member into a new zone, which may each be held at different pressures. The pressure differentials between zones, for example, may be about 2 bar to 6 bar. Reduced pressure fluctuations allow fluid to enter the compartments 132 faster, thereby increasing the capacity of the rotary pressure filter apparatus 100. Furthermore, the filter members 134 have been shown to have less movement with reduced pressure fluctuations, thereby providing the potential for a longer lifespan of the filter member 134 as well.

Figure 4:
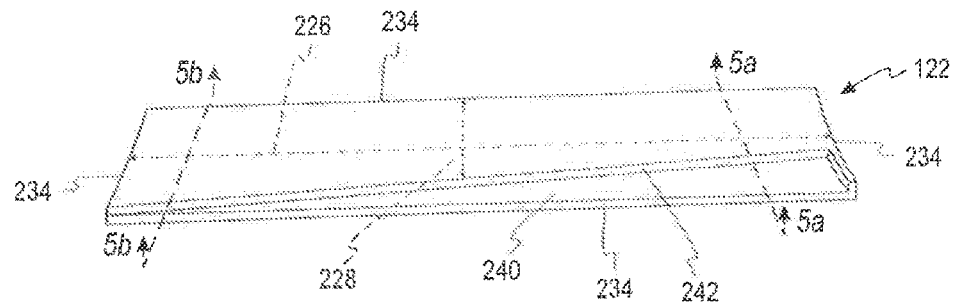
FIG. 4 shows a perspective view of a sealing member for use in one embodiment of the present invention.
Figure 5A:
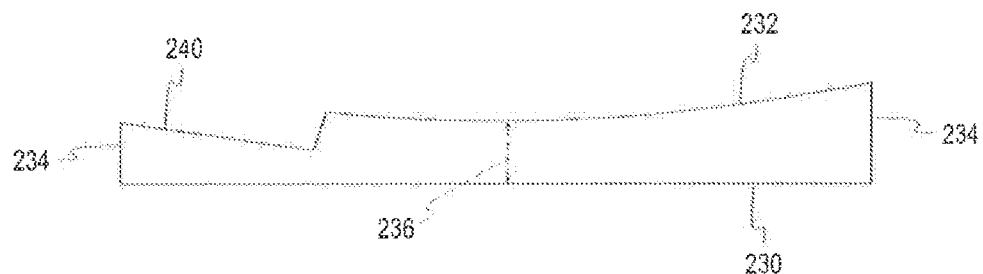
FIG. 5a shows a cross section of the sealing member of FIG. 4.
Figure 5B:
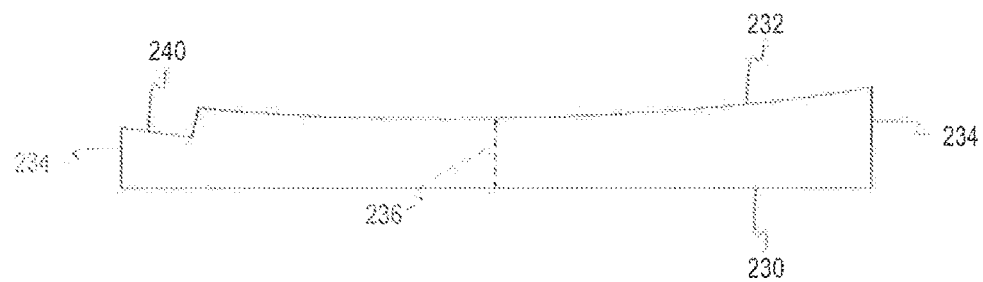
FIG. 5b shows another cross section of the sealing member of FIG. 4.

A sealing member 122 in accordance with one embodiment of the present invention is shown in FIGS. 4, 5A, 5B. The sealing member 122 has a unitary body 224, preferably made from a metal or polymer material, that extends along a length direction 226 and a width direction 228. The length direction is the same as the longitudinal direction 110 (FIG. 1) of the rotary drum 106, and the width direction is the same as the direction generally tangential to the rotary drum 106. A first side 230 (FIGS. 5a and 5b) of the sealing member 122 is generally planar. A second side 232 of the sealing member 122 is spaced from the first side and connected to the first side by edges 234, the volume between the first side and second side defining a thickness 236 of the sealing member in the radial direction of the rotary drum 106. The second side 232 is curved and concave relative to the first side 230, and is configured to fit flush against the surface of a cylindrical drum, such as the rotary drum 106 of the rotary pressure filter apparatus 100.

The sealing member 122 includes a cutout portion 240 that varies in its width along at least one portion of its length. In the embodiment shown in FIGS. 1-5b, the cutout portion is tapered such that the width is narrower at one portion than at another portion of the longitudinal direction. The taper has a linear edge 242 and is a single taper extending substantially the entire longitudinal direction of the sealing member. In the embodiment shown, the cutout portion 240 is variable in its width along its length direction only through a partial thickness 236 of the sealing member 122, allowing more strength for the sealing member 122 around the cutout portion 240. The cutout portion 240 allows the compartments 132 to enter open to the pressure in the upstream zone more gradually because as the compartments 132 passes the sealing member 122, the cutout portion 240 allow fluid communication with only a portion of the compartments, and that portion increases in size gradually over time as the rotary drum 106 continues to rotate. This gradual opening reduces pressure fluctuations of the material in the compartments 132.

Figure 6:
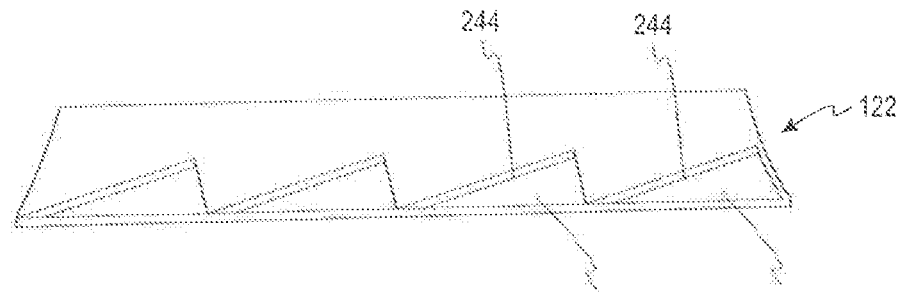
FIG. 6 shows a perspective view of another embodiment of the sealing member in accordance with the present invention.

FIG. 6 illustrates an alternative embodiment of the sealing member 122 in accordance with the present invention. In this embodiment, the sealing member has multiple cutout portions 242 in a saw tooth configuration, each having a tapered edge 244 such that its width varies in its width along at least one portion of its length.

Figure 7:
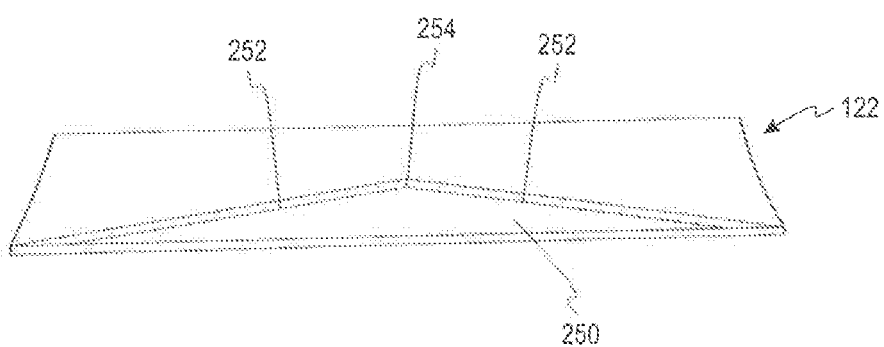
FIG. 7 shows a perspective view of another embodiment of the sealing member in accordance with the present invention.

FIG. 7 illustrates an alternative embodiment of the sealing member 122 in accordance with the present invention. In this embodiment, the sealing member has a single cutout portions 250 having two opposing tapered edges with a generally centered apex 254 such that the cutout portion 250 varies in its width along at least one portion of its length.

Figure 8:
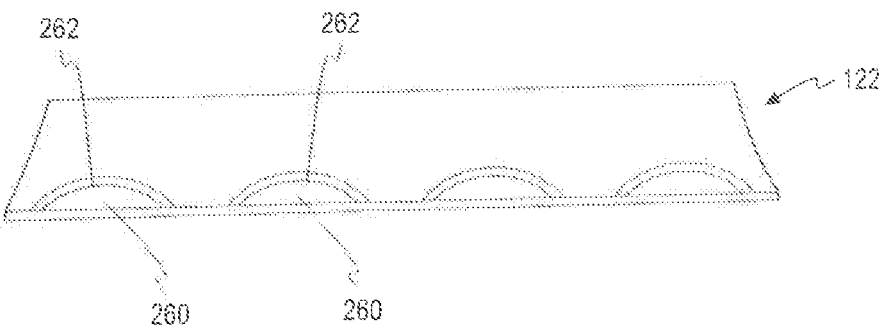
FIG. 8 shows a perspective view of another embodiment of the sealing member in accordance with the present invention.

FIG. 8 illustrates an alternative embodiment of the sealing member 122 in accordance with the present invention. In this embodiment, the sealing member 122 has multiple cutout portions 260, each cutout portion having curved edges 262 such that each cutout portion varies in its width along at least one portion of its length.

Those skilled in the art will recognize other configurations of the cutout portion that would be suitable to gradually open the compartments 132 as they rotate past a sealing member 122 and into a new zone.

In some embodiments each of the sealing members 122 may have a cutout portion 240. In other embodiments, only some of the sealing members have a cutout portion. For example, in the embodiment shown in FIG. 1, only the sealing members 122b, 122c entering the wash zones 124b, 124c have cutout portions.

The rotary pressure filter apparatus 100 may be used in a variety of separation processes. In some embodiments, the rotary pressure filter apparatus 100 is used to recover a solid product, or a liquid, or both, from a solid/liquid mixture. The solid is recovered from the apparatus as a filter cake that is formed on the filter members 134. The filtrate is recovered through outlet pipes 136. In one embodiment, the solid is a petrochemical, such as an aromatic carboxylic acid.

In one particular embodiment, the solid product is a crude terephthalic acid product and the liquid includes a solvent containing acetic acid. The crude terephthalic acid is recovered as a filter cake exiting the material passageway 120e. The solvent is recovered as filtrate exiting outlet pipes 136.

In another particular embodiment, the solid product is a purified terephthalic acid product and the liquid includes water. The purified terephthalic acid is recovered as a filter cake exiting the material passageway 120e. The water is recovered as filtrate exiting outlet pipes 136.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A rotary pressure filter apparatus comprising:
   a housing capable of withstanding an internal pressure above ambient;
   a rotary drum having at least one round cross-section and configured to rotate inside the housing around an axis, a length of the axis defining a longitudinal direction; the rotary drum being spaced from the housing to define a annular plenum therebetween;
   at least one sealing member configured to contact the rotary drum, each sealing member separating the annular plenum between the housing and the rotary drum into zones, the sealing members adapted to pressure seal each zone from the other zones, the sealing member extending in a tangential direction and in the longitudinal direction, the sealing member having at least one cutout portion such that the size of the at least one cutout portion in the tangential direction is variable along at least one portion of the longitudinal direction;
   at least one material passageway adapted to allow passage of material between the annular plenum in each zone and a location outside the housing;
   a plurality of compartments on an outer surface of the rotary drum and configured such that material can be flow between the plenum and the compartments, the compartments positioned so as to rotate sequentially through each of the zones as the rotary drum rotates, each compartment having at least one filter member; and
   at least one filtrate outlet in fluid communication with the at least one filter member.

2. The apparatus of claim 1, wherein said plurality of compartments comprises a plurality of rows of compartments, each row having at least two compartments.

3. The apparatus of claim 2, wherein said at least two compartments in each row are arranged on the outer surface of the rotary drum along the longitudinal direction.

4. The apparatus of claim 1, wherein the cutout portion has at least one taper such that the cutout portion is narrower at one portion than at another portion along the longitudinal direction.

5. The apparatus of claim 4, wherein the at least one taper comprises a single taper extending substantially the entire longitudinal direction of the sealing member.

6. The apparatus of claim 4, wherein at least one taper comprises multiple tapers.

7. The apparatus of claim 4, wherein the at least one taper comprises a linear edge.

8. The apparatus of claim 1, wherein the size of the at least one cutout portion is variable in the tangential direction along the longitudinal direction only through a partial thickness of the sealing member.

9. The apparatus of claim 1, wherein at least one of the zones having a sealing member with a variable sized cutout portion comprises a wash zone.

10. A sealing apparatus for a rotary pressure filter, the sealing member comprising:
    a sealing member having a unitary body, the unitary body having a first side extending along a length and a width of the sealing member, a second side of the sealing member being spaced from the first side and connected to the first sides by edges, the volume between the first side and the second side defining a thickness of the sealing member, the second side being curved and concave relative to the first side, the second side configured to fit flush against the surface of a cylindrical drum and including at least one cutout portion such that the width of the at least one cutout portion is variable along at least one portion of its length; and
    a mechanism adapted to actuate the sealing member, the mechanism configured to move the sealing member in the direction of its thickness.

11. The apparatus of claim 10, wherein the width of the cutout portion has at least one taper such that the cutout portion is narrower at one portion than at another portion along the longitudinal direction.

12. The apparatus of claim 11, wherein the at least one taper comprises a single taper extending substantially the entire longitudinal direction of the sealing member.

13. The apparatus of claim 11, wherein at least one taper comprises multiple tapers.

14. The apparatus of claim 11, wherein the at least one taper comprises a linear edge.

15. The apparatus of claim 11, wherein the width of the at least one cutout portion is variable along its length only through a partial thickness of the sealing member.

16. The apparatus of claim 10, wherein the mechanism comprises a pneumatic mechanism.

17. A process for recovering a solid product from a solid/liquid mixture, comprising:
    filtering a solid/liquid mixture in the rotary pressure filter apparatus of claim 1 to form the solid product as a filter cake;
    removing the filter cake from the rotary pressure filter apparatus.

18. The process of claim 17, wherein the solid/liquid mixture comprises an aromatic carboxylic acid.

19. The process of claim 17, wherein the solid/liquid mixture comprises terephthalic acid.

20. The process of claim 19, further comprising recovering a liquid from the solid/liquid mixture.

21. The process of claim 20, wherein the recovered liquid comprises a solvent.

22. The process of claim 21, wherein the solvent comprises acetic acid.

23. The process of claim 17, wherein the solid/liquid mixture comprises purified terephthalic acid.

* * * * *